(12) United States Patent
Fisher et al.

(10) Patent No.: US 11,071,998 B2
(45) Date of Patent: Jul. 27, 2021

(54) THICK POLYMER COATING OF A SUBSTRATE APPARATUS AND METHOD

(71) Applicants: George Irvin Fisher, North Salt Lake, UT (US); Benjamin Hansen Gilmore, North Salt Lake, UT (US); Kyle Edward Roberts, North Salt Lake, UT (US)

(72) Inventors: George Irvin Fisher, North Salt Lake, UT (US); Benjamin Hansen Gilmore, North Salt Lake, UT (US); Kyle Edward Roberts, North Salt Lake, UT (US)

(*) Notice: Subject to any disclaimer, the term of this patent is extended or adjusted under 35 U.S.C. 154(b) by 163 days.

(21) Appl. No.: 16/117,848

(22) Filed: Aug. 30, 2018

(65) Prior Publication Data

US 2019/0070634 A1    Mar. 7, 2019

Related U.S. Application Data

(60) Provisional application No. 62/554,467, filed on Sep. 5, 2017.

(51) Int. Cl.
| | |
|---|---|
| *B05D 7/14* | (2006.01) |
| *B05D 3/00* | (2006.01) |
| *B05D 1/04* | (2006.01) |
| *C09D 127/16* | (2006.01) |
| *B05D 7/00* | (2006.01) |
| *B05D 3/02* | (2006.01) |

(Continued)

(52) U.S. Cl.
CPC ............. *B05D 7/14* (2013.01); *B05D 1/04* (2013.01); *B05D 3/002* (2013.01); *B05D 3/007* (2013.01); *B05D 3/0218* (2013.01); *B05D 7/54* (2013.01); *C09D 127/16* (2013.01); *B05D 1/38* (2013.01); *B05D 2202/00* (2013.01); *B05D 2203/35* (2013.01); *B05D 2350/60* (2013.01); *B05D 2507/00* (2013.01); *C08K 3/041* (2017.05); *C08K 3/042* (2017.05); *C08K 3/046* (2017.05); *C08L 2205/025* (2013.01)

(58) Field of Classification Search
CPC ....................................................... B05D 1/06
See application file for complete search history.

(56) References Cited

U.S. PATENT DOCUMENTS

| | | | |
|---|---|---|---|
| 5,348,211 | A | 9/1994 | White |
| 6,537,483 | B1 | 5/2003 | Cartwright |

(Continued)

FOREIGN PATENT DOCUMENTS

| | | |
|---|---|---|
| CN | 105885356 A | 8/2016 |
| CN | 107139505 A | 9/2017 |

(Continued)

OTHER PUBLICATIONS

Kynar/kynarflex PVDF Performance Characteristics & Data (Year: 2014).*

(Continued)

*Primary Examiner* — Alex A Rolland
(74) *Attorney, Agent, or Firm* — Pate Baird, PLLC

(57) ABSTRACT

A method for applying a polymer coating to a substrate wherein the resultant layer of polymer on the substrate has a substantial thickness. A mixture of polymer material, including reactor bead polymer and ground polymer, may be used in a powder coating process to achieve thicker polymer layers.

20 Claims, 2 Drawing Sheets

(51) Int. Cl.
*C08K 3/04* (2006.01)
*B05D 1/38* (2006.01)

(56) References Cited

U.S. PATENT DOCUMENTS

| | | |
|---|---|---|
| 6,673,193 B1 | 1/2004 | Bertram |
| 8,057,721 B2 | 11/2011 | Thrash |
| 8,808,612 B2 | 8/2014 | Alms |
| 9,616,589 B2 | 4/2017 | Kimble |
| 2013/0115380 A1* | 5/2013 | Zhang .................... B05D 5/083 427/485 |

FOREIGN PATENT DOCUMENTS

| | | | |
|---|---|---|---|
| JP | 2008063521 A | * | 3/2008 |
| WO | WO2013/071422 | | 5/2013 |

OTHER PUBLICATIONS

Kynar superflex 2501-20 spec sheet (Year: 2020).*
Kynar Flex 2850 PC Powder Coating Information (Year: 2006).*
Translation of JP 2008063521, no date.*

* cited by examiner

THICK POLYMER COATING OF A SUBSTRATE APPARATUS AND METHOD

RELATED APPLICATIONS

This utility patent application claims the benefit of U.S. Provisional Patent Application Ser. No. 62/554,467, filed on Sep. 5, 2017, which is hereby incorporated by reference in its entirety.

BACKGROUND

The Field of the Invention

The invention relates to formulations, apparatus and methods used to coat surfaces with a polymer, and more specifically to polymer coating of substrates using a polymer mixture and method that enables increased thickness of polymer coatings in a more efficient manner.

Background

Polymeric film-forming materials may be applied as coatings for functional, protective purposes and even for decoration. A variety of coating methods are available. Most methods may be used with a wide range of base materials and coating compositions.

A variety of methods employing powdered plastics and resins may be used commercially to apply polymeric coatings to various articles or substrates. Such methods may include fluidized bed, plasma spray, electrostatic spray, electrostatic fluidized bed, and hot flocking, as well as combinations and variations of these methods.

In one example using an electrostatic spray process, the coating powder is withdrawn from a reservoir in an air stream and electrostatically charged in the high voltage corona field of a spray gun. The charged powder particles are attracted to the grounded metal object, or substrate, to be coated and adhere to it by electrostatic attraction. The coated substrate may then be placed in an oven and the coating is fused to form a continuous film. If the powder is sprayed on a preheated article or substrate, the powder melts and fuses directly on the hot surface. Further heating to fuse or cure the coating may be required depending on the type of coating powder and the substrate. Essentially the same process may be repeated to obtain a thicker layer of polymer on a substrate.

In another example using a plasma-coating method, a high temperature plasma is established in an inert gas such as nitrogen, and the coating powder is introduced at the periphery of the plasma. The particles melt and are propelled at high velocity to the substrate where they form a film.

In another example using a hot-flocking technique, powders may be dispersed in air and sprayed or blown onto the preheated article or substrate, where the powder melts and forms a coating. In a variation of this technique, small parts are preheated and dropped into a bed of powder kept in a mobile state by vibration and the parts are completely coated with an unfused layer of powder on the surface.

All powder-coating methods may generally be referred to as fusion-coating methods or processes, since the material must be melted and fused to form a continuous coating at some stage in the process.

Generally, a powdered or granulated polymer is used to electrostatically powder coat a substrate. It is recommended that a ground, powdered, or granulated polymer be used for electrostatic powder coating. Put another way, it is not recommended to use unground, rough, or reactor beads of the polymer when electrostatically powder coating a substrate.

The average thickness of a polymer layer was about 1 mm, and it would take many cycles to build up a significant polymer layer on a substrate. Some methods were developed that could result in a polymer layer of about 2-3 mm of thickness, and there can be referred to as "high build" processes. It would be an advance in the art to have a method that utilizes a cheaper polymer material and can obtain a greater polymer thickness, require fewer cycles in the oven, and still maintain and improve the physical and chemical properties of the coating.

BRIEF SUMMARY OF THE INVENTION

The present invention or method described herein may include a process for coating a substrate using a mixture of reactor beads of polymer mixed with the usual ground or powdered polymer using an electrostatic powder coating process.

Then a specific temperature range is used to promote melting of the polymer(s) without significant run-off of the polymer coating.

In one embodiment, a method for coating a substrate with a polymer may comprise selecting a reactor bead polymer, selecting a ground polymer, mixing a suitable amount of the reactor bead polymer and a suitable amount of the ground polymer into a polymer mixture, providing a substrate, heating the substrate, coating the substrate with the polymer mixture, and heating the substrate and the polymer mixture. The steps of coating the substrate with another layer of the polymer mixture and heating the substrate and the additional layer of the polymer mixture may be repeated until a polymer thickness of at least 6.0 mm, and generally between 7.5 mm and 10 mm, is achieved on the substrate.

An embodiment of the method may include repeating the steps of coating the substrate with another layer of the polymer mixture and heating the substrate and the additional layer of the polymer mixture less than 15 times to achieve the polymer thickness. The polymer mixture may be approximately 50% the reactor bead polymer and approximately 50% the ground polymer. The polymer mixture may include at least one additive, such as graphene, nanofibers, nanotubes, or the like. The coating may be achieved by a powder coating process.

Generally, the substrate and the polymer mixture are heated until the polymer mixture is substantially melted. The heating may be done at a temperature of at least 260° C. Any temperature suitable for melting the polymer mixture and not harming the substrate may be used. The substrate may be of any suitable composition and may include a composite substrate.

In one embodiment, a polymer mixture may include a reactor bead polymer and a ground polymer and an additive, such as graphene. A substrate may be provided and the substrate may be prepared for the coating process in a manner that promotes a more even and complete resultant layer of polymer.

The substrate may be heated and then cooled. A primer layer may be applied to the substrate before any polymer mixture is coated onto the substrate. The substrate may be coated with the polymer mixture to provide a first layer of polymer. The substrate and first layer of polymer may be heated, but the first layer of polymer may not completely melt, resulting in the first layer of polymer having bumps. The polymer mixture may be applied to provide a second layer of polymer over this un-melted first layer of polymer. Then, the layers of polymer and the substrate may be heated again. This process may result in both the first layer of polymer and the second layer of polymer completely melting, resulting in a smooth finished layer of polymer.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through the use of the accompanying drawings in which:

DETAILED DESCRIPTION OF THE PREFERRED EMBODIMENTS

Figure 1:
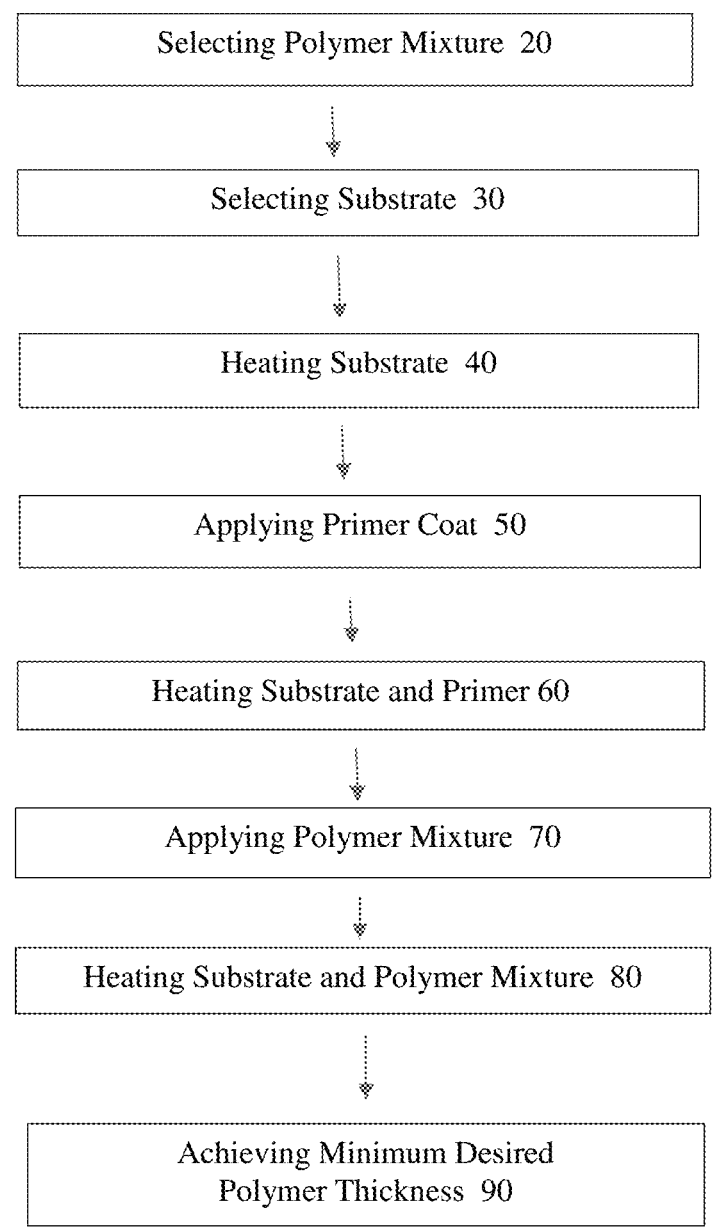
FIG. 1 is a schematic block diagram of a method described herein.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

In one embodiment, a method for achieving very high builds, or thick layers, of PVDF (i.e., KYNAR®) fluorocarbon electrostatic powder coatings is disclosed. Any suitable PVDF powder may be used, including without limitation, SOLER® KF and other similar compounds. The principle observed may apply to other partially fluorinated polymers such as ETFE and ECTFE (i.e., TEFZEL® and HALAR®, respectively). Any suitable partially fluorinated polymers may be used, including without limitation, FLUON® and other similar compounds.

KYNAR® PVDF resins have a high coefficient of thermal expansion. This has been a difficulty and a challenge in the powder coating of vessels, pipes, tanks, agitators, mixers, pump housings, valves, and other substrates.

The process of powder coating may place a properly prepared metal or other substrate in an oven and heated to about 500° F. (about 260° C.). After the part or substrate to be coated reaches equilibrium throughout, it may be removed from the oven and a primer layer may be applied. The purpose of the primer layer is to aid in adhesion and reduce the likelihood of bubbling, blisters, and peeling over time. Following the application of the primer layer, successive cycles of heating and powder application may follow. Generally, 8-12 mils ("mils" referring to a thousandth of an inch), or about 0.2032 mm-0.3048 mm, of powder are applied in one of these cycles. The desired minimum thickness is usually greater than 40 mils (or 1 mm).

As the thickness of the coating increases, especially with KYNAR® PVDF, the stresses upon the adhesive bond to the substrate increase. Failures have been observed where the stress has become too great and overcomes the adhesion of the coating to the substrate, thereby creating voids.

In order to compensate and to reduce these stresses, additional KYNAR® copolymer resin mixtures may be dry blended into the standard KYNAR® 2850 PC resin. These other KYNAR® resins are collectively known as KYNAR FLEX® or SUPER FLEX®. They contain a comonomer of HFP, hexafluoropropylene. The crystalline structure of the PVDF is reduced and the tensile modulus drops as well. By utilizing these more flexible grades the resultant stresses on coatings can be reduced significantly.

In one embodiment, KYNAR SUPERFLEX® 2501 copolymer may be utilized. Currently, this version of this material has a relatively high content of HFP. The price of this material is significantly lower than other versions of this or similar material. The reason for the lower price is because it is reactor bead and has not gone through any subsequent processing steps, such as pelletizing, extruding or grinding into powder. The reactor bead form is believed to be unsatisfactory for coating, as it does not flow like a ground KYNAR® powder.

However, mixing the reactor bead with the standard 2850 PC KYNAR® in ratios of 10-90, 20-80, 30-70, and 50-50 may be superior in several ways. For example, the likelihood of disbanding is reduced. Also, smoother coatings may be achieved as compared to the standard formulation of 2850 PC. Also, thicker coatings may be achieved. Thus, it is an unexpected benefit to include the reactor bead KYNAR® as part of the polymer mixture used for powder coating.

In one embodiment, a polymer mixture, or mixture, of 50-50 KYNAR® 2501 and 2850 may be utilized while attempting to apply a very thick KYNAR® coating on various substrates. Just below the melt temperatures of the KYNAR® powder mixture, bumps may form in the coating on metal substrates. In subsequent cycles in and out of the oven, these bumps may not melt and flow.

More powder may be added to cover the bumps, which may be considered reminiscent of covering the coating with something that looked like "powdered sugar" over the whole surface covering the bumps protruding from the surface of the substrate. Then, returning the parts, or substrate, to the oven for flow out may result in or allow this "powdered sugar" layer to completely fuse and/or cover the bumps after sufficient time in the oven. This process may be repeated on multiple parts or substrates. This process may be repeated for one or more cycles while polymer coating a part or substrate.

It may be that these bumps are holding an excess of powder on the metal substrate, much in the way of a composite giving form and reinforcement to additional powder until the melt occurs. Generally, reactor bead polymers are not considered suitable for coating because the reactor bead does not flow like ground KYNAR® powder for coating. The lack of flow may explain why the bumps form slightly below the melt transition temperature. In any case, it may be possible to perform spray coatings in each cycle having from 10-15 mils (or about 0.254 mm to 0.381 mm) to 30-40 mils (or about 0.762 mm to 1.0 mm) per cycle.

A method may comprise selecting an appropriate polymer, mixing a portion or reactor bead polymer with ground polymer, placing a properly prepared metal or other substrate in an oven and heating the substrate to about 500° F. (about 260° C.) and letting the substrate reach equilibrium, remove from the oven, applying a primer coat, heating the substrate and primer coat, applying the polymer mixture by powder coating with approximately 8-12 mils (about 0.2032 mm-0.3048 mm) layer of polymer powder in each cycle, and heating the substrate and polymer mixture to melt the polymer. A "cycle" may be considered the steps of applying a layer of polymer powder coating and then heating the substrate and polymer to about 500° F. (about 260° C.) and letting the substrate reach equilibrium to achieve the proper melt or flow of the polymer. Successive cycles may be utilized to achieve a desired minimum thickness of polymer coating. The desired minimum thickness is usually greater than 40 mils (or 1.0 mm).

Referring more particularly to FIG. 1, a method 10 may comprise a number of steps to provide a thick polymer coating to a substrate. For example, and not by way of limitation, a method 10 may comprise selecting a polymer mixture 20.

A suitable polymer mixture may include almost any ratio of a suitable polyvinylidene fluoride (PVDF) polymer, wherein the ratio is comprised of a reactor bead form of the PVDF polymer and a ground or pelletized form of the PVDF polymer. The ratio of reactor bead polymer to ground polymer may be anywhere from 10-90 to 50-50. KYNAR® may be considered a suitable polymer, as well as any other polymer similar to KYNAR® or any other polymer that may be used or desired as a polymer coating on substrates. A suitable polymer mixture may be comprised of one particular polymer and/or one or more forms of that polymer.

A suitable polymer mixture may also include an additive, or filler. For example and not by way of limitation, a suitable additive may include graphene, nanofibers, nanotubes, silica, mica and/or any similar material. For example and not by way of limitation, a suitable additive may include inorganics, such as manganese disulphide, aluminum oxide, tungsten carbide and/or any similar material. The amount of additive or filler utilized in a polymer mixture may be from about 0.1% to 10% by weight depending on the filler material selected for use.

The inclusion of an additive, or filler, in a polymer mixture may be described as utilizing a "tortuous path" method. The spaces between the molecular chains may be filled and barriers created from flakes of a suitable additive.

A method 10 may comprise selecting a substrate 30 to be coated with the selected polymer mixture. Virtually any substrate may be selected. Generally, the substrate may be a metal substrate. A substrate may also be a composite substrate, for example and not by way of limitation, a substrate that may be a composite of metal and/or fiberglass.

A substrate may be considered suitable as long as it can withstand the heating process required to substantially melt the polymer being applied to the substrate. In other words, any substrate may be used in the process described herein as long as the substrate has a higher melting point than the polymer coating to be applied to the substrate.

A substrate may require a certain amount of processing before the substrate is heated. For example, the substrate may be cleaned, corners on the substrate may need to be rounded, or unwanted abnormalities or defects on the surface of the substrate may need to be addressed. Moreover, the surface of the substrate may be grit blasted in preparation for the coating process.

A method 10 may comprise heating the substrate 40. A substrate may be heated to about 500° F. (about 260° C.), or about 550° F. (about 288° C.). The substrate may then be allowed to reach equilibrium. The substrate may also be removed from the oven to allow for cooling.

A method 10 may comprise applying a primer coat to the substrate 50. A primer coat may be of any suitable material. For example and not by way of limitation, a primer may be a KYNAR® expoxide primer. Such a primer may be a mix of thermosetting and thermoplastic resins.

A method 10 may comprise heating the substrate and primer 60. The substrate and primer may be heated to melt the primer coat onto the substrate in preparation for the polymer mixture coating. The primer may be used to help adherence of the polymer mixture to the substrate and to prevent peeling or bubbles.

A method 10 may comprise applying the polymer mixture 70. Applying the polymer mixture may be accomplished by any suitable means, including without limitation, powder coating and hot-flocking.

A method 10 may comprise heating the substrate and polymer mixture 80. The substrate and polymer mixture may be heated to about 500° F. (about 260° C.). The substrate and polymer mixture may be heated to about 440° F. (about 227° C.), and may be as low as 400° F. (about 205° C.). In certain embodiments, the temperature used for heating a substrate and a polymer mixture may be as low as 75° F. (about 24° C.).

The heating is performed to allow the polymer mixture to melt or flow onto the substrate. Thus, the heating may be performed at any temperature that allows for or produces the desired melting or flowing of the polymer mixture onto the substrate.

A method 10 may comprise achieving a minimum desired polymer thickness 90. Generally, multiple "cycles" may be required to achieve the minimum desired polymer thickness. A "cycle" may be defined as the steps of applying the polymer mixture to the substrate and heating the substrate and polymer mixture to melt or flow the polymer onto the substrate.

In one embodiment as described herein, the step of applying the polymer mixture may result in a layer of polymer mixture that is about 10-15 mils (or about 0.254 mm to 0.381 mm) to 30-40 mils (or about 0.762 mm to 1.0 mm) thick per cycle. This significantly decreases the processing time for polymer coating a substrate, but allows for significantly increased thicknesses of coatings.

Figure 2:
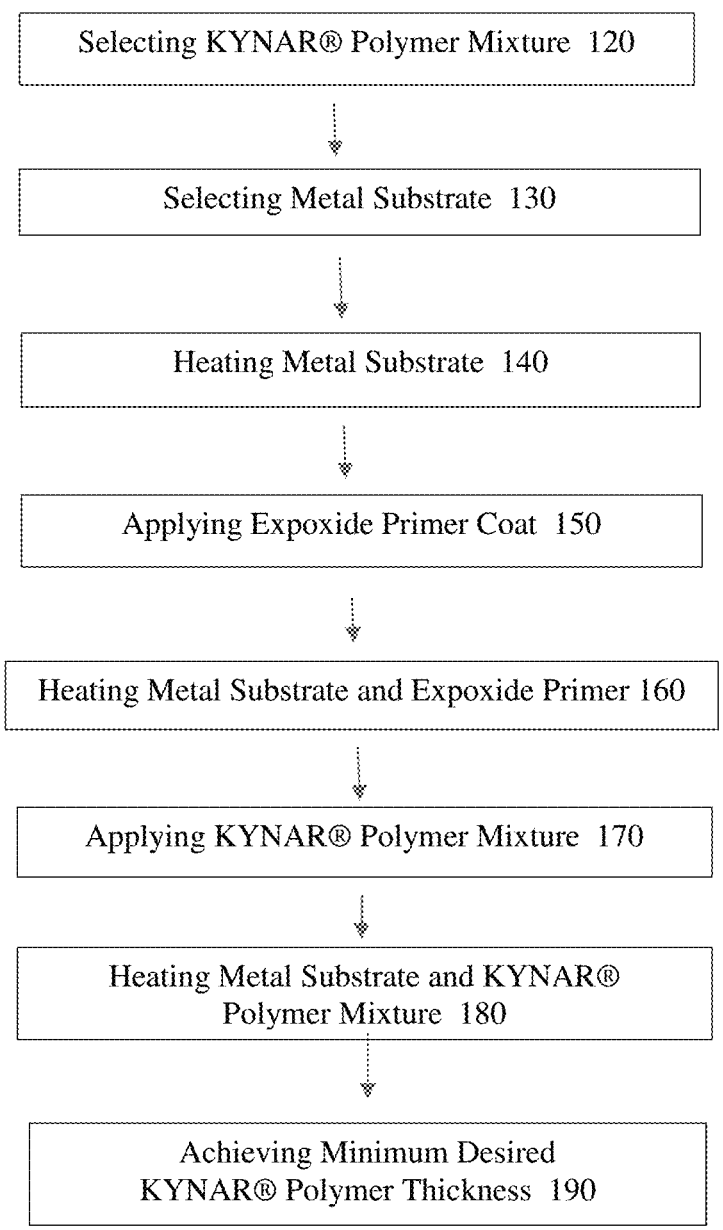
FIG. 2 is a schematic block diagram of a method described herein.

Referring more particularly to FIG. 2, another embodiment of a method 10 may be described. For example, and not by way of limitation, a method 10 may comprise selecting a KYNAR® polymer mixture 120. A KYNAR® polymer mixture may comprise a 50-50 blend of KYNAR® 2501 reactor bead and KYNAR® 2850 PC, which KYNAR® 2850 PC is generally considered a standard powder for powder coating applications. The mixture of KYNAR® 2501 with the KYNAR® 2850 may reduce the amount of shrinkage and pull away from the substrate. Also, the KYNAR® 2501 may be considered valuable or desirable in coating application because the modulus is lower and the flexibility is higher due to the higher concentration of hexafluoropropyl (HFP) comonomer added to the KYNAR® 2501.

A method 10 may comprise selecting a metal substrate 130. A metal substrate to be coated may be cleaned and prepared for coating. For example, and not by way of limitation, sharp edges may be radiused and any weld splatter removed as necessary. The surfaces of the substrate to be coated may be grit blasted to a NACE number 1 or 2 grade profile. The surfaces of the substrate that are not coated may be either masked or covered with a mold release agent. The surfaces of the substrate may be dusted prior to the coating process.

A method 10 may comprise heating the metal substrate 140. For example and not by way of limitation, the metal substrate may be hung in the oven and the temperatures of the oven and substrates reach an equilibrium of about 550° F. (or about 288° C.). It is not unusual that the parts or substrates to be coated may be about 20° F. to 30° F. (about 5° C. to 10° C.) lower than the thermostat setting of the oven. In order to insure uniform heating, and also to prevent drips and the runs, the parts or substrates may be rotated about their major axis constantly, in and out of the oven. Temperatures may be monitored with a remote infrared sensing thermocouple.

The process of heating certain parts or substrates may take a minimum of two (2) hours based on the thickness of the metal substrate. Setting the oven temperature to about 550° F. (or about 288° C.) also assures that any organic compounds are flashed off or turned to carbon dust. A substrate may be rotated about a major axis at approximately 10-12 RPM, in and out of the oven. When the parts or substrate are at or near about 550° F. (or about 288° C.) they may be removed from the oven.

A method 10 may comprise applying an expoxide primer coat 150. An expoxide primer coat may be of any suitable composition. The thickness of a primer layer may be approximately 8-12 mils (about 0.2032 mm-0.3048 mm). In certain embodiments, when the parts or substrates are relatively thick, a layer of top coat may be applied to the primered surface.

A method 10 may comprise returning the metal substrate to the oven and heating the metal substrate and expoxide primer 160. The metal substrate and expoxide primer coating, with or without top coat, may be reheated above the melt temperature of the KYNAR®. The metal substrate may be kept in the oven at about 380° F. (193° C.) for approximately thirty-five (35) minutes. The time of the reheating may depend on how long it takes for the primer, with or without top coat, to properly melt and fuse.

A method 10 may comprise applying the KYNAR® polymer mixture 170. A KYNAR® polymer mixture, or other suitable polymer, may be applied to the substrate, which generally has a primer coat. Generally, another approximately 8-12 mils (about 0.2032 mm-0.3048 mm) of polymer mixture coating may be applied before it cools too much, which would increase the risk of powder drop off.

The formation of bumps or vertical projections from the coated substrate surface may occur at approximately the melt temperature of the KYNAR® 2850, between approximately 380° F. and 400° F. (or approximately 193° C. and 205° C.). Generally, the coating process is stopped and the parts or substrates are put back in the oven before too many bumps appear.

A method 10 may comprise heating the metal substrate and KYNAR® polymer mixture 180. This heating step may be performed at any suitable temperature and for any suitable length of time. For example and not by way of limitation, in the oven may be set at about 380° F.-400° F. (or approximately 193° C.-205° C.) for approximately thirty-five (35) minutes. The heating step is intended to properly melt and/or fuse the KYNAR® polymer mixture.

A method 10 may comprise achieving a minimum desired KYNAR® polymer thickness 190. The minimum desired KYNAR® polymer thickness may be any suitable or desired thickness. Generally, when the method disclosed herein is used, the resulting KYNAR® polymer thickness may be approximately 300 mils or more (or over 7.6 mm).

In certain embodiments of a method, bumps or protrusions may appear on the surface of the substrate, even after heating. A method may including coating or flooding the substrate surface with powder even though no melt is occurring, or the melt is incomplete. The substrate may then be heated at approximately 400° F. (approximately 205° C.) and for approximately forty (40) minutes to encourage any bumps to melt or flow out.

In certain embodiments of a method, the steps of coating a substrate surface with the KYNAR® polymer mixture, with or without bumps on the surface of the substrate, may be repeated as required to achieve the minimum desired thickness. The use of the KYNAR® polymer mixture, or any suitable polymer mixture that includes reactor bead and ground polymer, may be used to enable thicker coatings of polymer per cycle.

After the desired minimum thickness is achieved, the parts or substrates may be allowed to cool in any suitable manner. For example and not by way of limitation, the substrate may be allowed to hang in the oven and continue to be rotated as the door of the oven is left slightly open and the temperature setting of the oven is at zero. This slow cooling and rotation may last for approximately three (3) hours.

Any suitable finish work may also be performed on the substrate or part, as may be desired to prepare a part for its particular placement and use.

What is claimed and desired to be secured by United States Letters Patent is:

1. A method for coating a substrate with a PVDF polymer, the method comprising:
   selecting a reactor bead PVDF polymer having an average effective diameter of about five (5) micrometers;
   selecting a ground PVDF polymer;
   mixing a suitable amount of the reactor bead PVDF polymer and a suitable amount of the ground PVDF polymer into a polymer mixture;
   providing a substrate;
   heating the substrate;
   coating the substrate with the polymer mixture; and
   heating the substrate and the polymer mixture.

2. The method of claim 1, further comprising:
   coating the substrate with another layer of the polymer mixture;
   heating the substrate and the additional layer of the polymer mixture; and
   repeating these steps until a polymer thickness of between 7.5 mm and 10 mm is achieved on the substrate.

3. The method of claim 2, wherein the steps of coating the substrate with another layer of the polymer mixture and heating the substrate and the additional layer of the polymer mixture are repeated less than 15 times to achieve the polymer thickness.

4. The method of claim 2, wherein the coating is achieved by a powder coating process.

5. The method of claim 2, wherein the substrate and the polymer mixture are heated until the polymer mixture is substantially melted.

6. The method of claim 2, wherein the heating is done at a temperature of at least 260° C. and the substrate is rotated during heating.

7. The method of claim 1, wherein the polymer mixture is approximately 50% the reactor bead PVDF polymer and approximately 50% the ground PVDF polymer.

8. The method of claim 1, wherein the substrate is a composite substrate.

9. The method of claim 1, wherein the polymer mixture further comprises at least one additive selected from the group consisting of graphene, nanofibers, and nanotubes.

10. A method for coating a substrate with a PVDF polymer, the method comprising:

selecting a reactor bead PVDF polymer having an average effective diameter of about five (5) micrometers;

selecting a ground PVDF polymer;

mixing the reactor bead PVDF polymer and the ground PVDF polymer into a polymer mixture, wherein the polymer mixture consists of the reactor bead PVDF polymer and the ground PVDF polymer;

providing a substrate;

heating the substrate;

coating the substrate with a primer;

coating the substrate with the polymer mixture to provide a first layer of polymer;

heating the substrate and the polymer mixture, wherein the first layer of polymer is not completely melted;

coating the first layer of polymer with the polymer mixture to provide a second layer of polymer; and heating the substrate, the first polymer layer and the second polymer layer until the first and second polymer layers are completely melted.

11. The method of claim 10, wherein the polymer mixture has a ratio of approximately 1:1 by weight of reactor bead PVDF polymer to ground PVDF polymer.

12. The method of claim 11, wherein the polymer mixture further consists of at least one additive selected from the group consisting of graphene, nanofibers, and nanotubes.

13. The method of claim 12, further comprising:

coating the substrate and the completely melted first and second polymer layers with the polymer mixture to provide an additional layer of polymer;

heating the substrate and the additional layer of polymer; and repeating these steps until a polymer thickness of at least 7.5 mm is achieved on the substrate.

14. The method of claim 10, wherein the polymer mixture further comprises at least one additive selected from the group consisting of graphene, nanofibers, and nanotubes.

15. The method of claim 14, further comprising:

coating the substrate and the completely melted first and second polymer layers with the polymer mixture to provide an additional layer of polymer;

heating the substrate and the additional layer of polymer; and repeating these steps until a polymer thickness of at least 7.5 mm is achieved on the substrate.

16. The method of claim 10, wherein the substrate is a composite substrate.

17. A method for coating a substrate with a PVDF polymer, the method comprising:

selecting a reactor bead PVDF polymer having an average effective diameter of about five (5) micrometers;

selecting a ground PVDF polymer;

mixing the reactor bead PVDF polymer and the ground PVDF polymer into a polymer mixture that has a ratio of approximately 1:1 for reactor bead PVDF polymer to ground PVDF polymer;

providing a substrate;

heating the substrate to approximately 550° F.;

allowing the substrate to cool for approximately 30 minutes;

coating the substrate with the polymer mixture;

heating the substrate and the polymer mixture at approximately 440° F. for approximately 45-60 minutes and rotating the substrate during heating; and allowing the substrate and the polymer mixture to cool for approximately 30 minutes.

18. The method of claim 17, further comprising:

coating the substrate with another layer of the polymer mixture;

heating the substrate and the additional layer of the polymer mixture at approximately 440° F. for approximately 45-60 minutes;

allowing the substrate and the additional layer of the polymer mixture to cool for approximately 30 minutes; and repeating these steps until a polymer thickness of at least 8.0 mm is achieved on the substrate.

19. The method of claim 18, wherein the coating the substrate with another layer of the polymer mixture may occur when a previous layer of polymer mixture has not completely melted after the heating.

20. The method of claim 17, wherein the polymer mixture further comprises at least one additive selected from the group consisting of graphene, nanofibers, and nanotubes.

* * * * *